United States Patent
Okuyama et al.

(10) Patent No.: US 12,455,959 B2
(45) Date of Patent: Oct. 28, 2025

(54) INTRUSION DETECTION SYSTEM

(71) Applicant: Mitsubishi Electric Corporation, Tokyo (JP)

(72) Inventors: Hiroshi Okuyama, Tokyo (JP); Toshinori Matsui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 15 days.

(21) Appl. No.: 18/683,513

(22) PCT Filed: Oct. 25, 2021

(86) PCT No.: PCT/JP2021/039280
§ 371 (c)(1),
(2) Date: Feb. 14, 2024

(87) PCT Pub. No.: WO2023/073761
PCT Pub. Date: May 4, 2023

(65) Prior Publication Data
US 2024/0354398 A1    Oct. 24, 2024

(51) Int. Cl.
*G06F 21/55*    (2013.01)
*G06F 21/60*    (2013.01)

(52) U.S. Cl.
CPC ............ *G06F 21/55* (2013.01); *G06F 21/602* (2013.01)

(58) Field of Classification Search
CPC ............................... G06F 21/55; G06F 21/602
See application file for complete search history.

(56) References Cited

U.S. PATENT DOCUMENTS

| | | | |
|---|---|---|---|
| 10,992,688 B2* | 4/2021 | Kishikawa | H04L 12/28 |
| 11,297,076 B2* | 4/2022 | Kim | H04L 63/1466 |
| 2016/0323287 A1* | 11/2016 | Kishikawa | H04L 12/40026 |
| 2019/0182267 A1* | 6/2019 | Aher | H04W 12/088 |
| 2021/0192867 A1* | 6/2021 | Fang | G07C 5/0816 |
| 2024/0040381 A1* | 2/2024 | Kim | H04W 12/121 |

FOREIGN PATENT DOCUMENTS

JP    6531011 B2    6/2019

OTHER PUBLICATIONS

International Search Report and Written Opinion mailed on Dec. 21, 2021, received for PCT Application PCT/JP2021/039280, filed on Oct. 25, 2021, 8 pages including English Translation.

* cited by examiner

*Primary Examiner* — Hee K Song
(74) *Attorney, Agent, or Firm* — XSENSUS LLP (57) ABSTRACT

An intrusion detection system comprises: a monitor listing for setting a rule(s) on which determination is performed whether communications data is normal or abnormal in every one of respective states; an intrusion detection unit for acquiring communications data flowing through a communications line(s), and for performing, by comparing the communications data with the monitor listing, determination on the presence or absence of abnormality in the communications data; a state management unit for acquiring a state of a host motor vehicle and/or that of a control device, and for changing over the monitor listing for use in the intrusion detection unit; and a processing time management unit for giving rise to increasing a processing time(s) of the intrusion detection unit in accordance with processing content of the intrusion detection unit.

18 Claims, 8 Drawing Sheets

MONITORING LIST 1 (AT TIME OF START-UP)

| ID/IP | Length | Payload |
|---|---|---|
| ID A | 4 | 0x01–0x05, 0xff |
| ID B | 8 | 0x100 |
| ID C | 160 | N/A |
| ID D | 180 | N/A |
| ID E | 300 | N/A |

MONITORING LIST 2 (AT TIME OF START-UP)

| ID/IP | Length | Payload |
|---|---|---|
| ID C | 160 | N/A |
| ID D | 180 | N/A |

MONITORING LIST 2 (AFTER UPDATE)

| ID/IP | Length | Payload |
|---|---|---|
| ID C | 160 | FIRST BYTE: 0x01 STATIC |
| | | SECOND BYTE: 0x02–0x10 |
| | | AFTER SECOND BYTE: N/A |
| ID D | 180 | N/A |

INTRUSION DETECTION SYSTEM

CROSS-REFERENCE TO RELATED APPLICATION

This application is based on PCT filing PCT/JP2021/039280, filed Oct. 25, 2021, the entire contents of which are incorporated herein by reference.

TECHNICAL FIELD

The disclosure of the present application relates to an intrusion detection system which is mounted on an automotive or motor vehicle.

BACKGROUND ART

In order to cause a motor vehicle to fall into abnormal behavior and/or to cause the data within a motor vehicle to leak out from it, a case is conceivable in which illegal or unauthorized data is flowed into a network(s) of the motor vehicle. In order to cope with these, having been proposed are technologies for detecting abnormality by using a technology of a key of cryptograph, and/or using that of unauthorized entry detection or intrusion detection.

In recent years, it can be found that on-vehicle or onboard systems of an automotive or motor vehicle are connected to a vehicle's exterior device(s) by way of a network(s), so that there arise a risk in which a third party having malicious intent makes unauthorized entry into an onboard system(s) from its outside by way of the network(s). If a third party makes unauthorized entry into the onboard system(s), there exists a possibility that, for example, in an ECU (Electronic Control Unit) being a control apparatus or device mounted on a motor vehicle, a program(s) of the ECU is tampered, and the control thereof is taken over, so that an accident of the motor vehicle might be lead to because it is remotely operated.

In a conventional onboard system, an abnormality handling method is conceivable in which, even when part of a device undergoes malfunction, abnormality caused by the malfunction is detected, so that safe running can be achieved by degenerating a function(s) of the device by means of fail-safe, or by doing the like.

However, when a program(s) is tampered and a mechanism to detect abnormality is changed due to a malfunction, or when information being a subject-matter or target of abnormality detection is disguised as if the information is of a normal value(s), it becomes difficult to detect abnormality as it is.

As a mechanism to detect abnormality of a motor vehicle which receives cyber-security attack, considerations have been underway for a mechanism to monitor communications data. As technologies of security with respect to such considerations, there exist a technology of message authentication, that of a digital signature, and/or the like, so that it is possible to detect abnormality due to the disguise of communications data; however, those belong to technologies to take countermeasures with respect to a known attack scenario, and so, it cannot always be said that unknown cyber-security attack can be coped with by those. When a program(s) is tampered, which becomes difficult to detect as abnormality, it becomes thus necessary to monitor not only communications data, but also the behavior of a motor vehicle and/or that of an ECU(s).

As one of the countermeasures against unknown cyber-security attack, there exists a technology of secure boot; however, because of a memory check which is performed at the time of activation or a start-up, a motor vehicle cannot cope with attack in a case in which the attack is received during the time when the motor vehicle is running. In addition, there arises a problem in that a process work-load becomes larger if a memory is checked at all times during the time when the motor vehicle is running. For dealing therewith, a mechanism is required in which, even when cyber-security attack is received not only at the time of activation or a start-up of a motor vehicle, but also during the time when the motor vehicle is running, abnormality is detected while a process work-load(s) of control processing is curbed, so that the motor vehicle is made being safely capable of running.

Patent Document 1 states that a monitoring method of communications data is changed in accordance with a state of a motor vehicle, and that abnormal data can be detected without increasing a work-load of data processing.

RELATED ART DOCUMENT

Patent Document

[Patent Document 1] Japanese Patent Publication No. 6531011

SUMMARY OF THE INVENTION

Problems to be Solved by the Invention

Patent Document 1 states such a way that, as a means for detecting unauthorized data without increasing a work-load of data processing in an on-vehicle or onboard device(s), a monitoring method of data is changed on the basis of a state(s) of a host motor vehicle; however, according to such a method, a monitoring data list(s) and/or a monitoring group list(s) change in accordance with the state(s), and thus, processing times vary. By making use of the variation, a third party is capable of acquiring internal information of an ECU. The information having been acquired brings about a fear to result in a hint at the time when the third party launches his or her attack.

The present disclosure in the application concerned has been directed at solving those problems as described above, an object of the disclosure aims to make a third party difficult to acquire a hint of attack by giving rise to increasing a processing time(s) of a security countermeasure(s).

Means for Solving the Problems

In an intrusion detection system disclosed in the disclosure of the application concerned, the intrusion detection system comprises: a monitor listing for setting a rule(s) on which determination is performed whether communications data is normal or abnormal in every one of respective states; an intrusion detection unit for acquiring communications data flowing through a communications line(s), and for performing, by comparing the communications data with the monitor listing, determination on the presence or absence of abnormality in the communications data; a state management unit for acquiring a state of a host motor vehicle and/or that of a control device, and for changing over the monitor listing for use in the intrusion detection unit; and a processing time management unit for giving rise to increasing a processing time(s) of the intrusion detection unit in accordance with processing content of the intrusion detection unit.

Effects of the Invention

According to the intrusion detection system disclosed in the disclosure of the application concerned, it becomes possible to detect illegal or unauthorized data upon through a communications line(s) of a motor vehicle, and also possible to reduce the ease of attack by an attacker.

EMBODIMENTS FOR CARRYING OUT THE INVENTION

Hereinafter, the explanation will be made referring to the drawings for the preferred exemplary embodiments of unauthorized entry or intrusion detection systems disclosed in the disclosure of the application concerned. Note that, hereinafter, the explanation will be made in detail for a case as a specific example of a control apparatus or device (ECU) which is applied to an on-vehicle or onboard control device whose control object(s) or target(s) is defined as an automotive or motor vehicle, and as onboard apparatus or device(s). The embodiments each are applicable as intrusion detection systems for detecting illegal or unauthorized data which enters into the control device in a motor vehicle being a control target. It should be noted that, in each of the figures, the same reference numerals and symbols designate the same or corresponding items, portions or parts.

Embodiment 1

Figure 1:
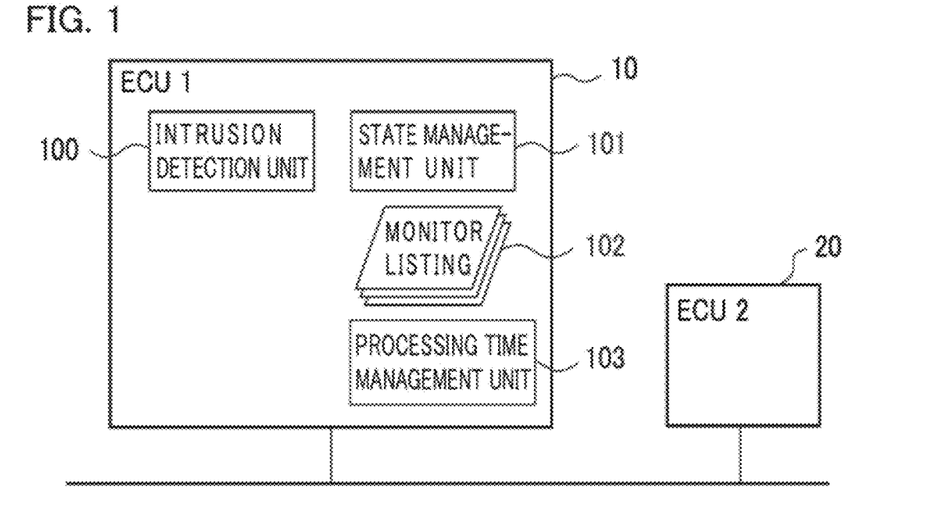
FIG. 1 is a block diagram illustrating an intrusion detection system according to Embodiment 1.

FIG. 1 is a block diagram illustrating an unauthorized entry or intrusion detection system according to Embodiment 1; and, in the diagram, control devices 10 and 20 being onboard control devices each provided with a motor vehicle (not shown in the figure) are connected to each other by way of a communications channel(s) or line(s) (network). The control device 10 is constituted of an unauthorized entry or intrusion detection unit 100, a state management unit 101, a monitor listing 102 and a processing time management unit 103, which are provided with the control device.

Figure 2:
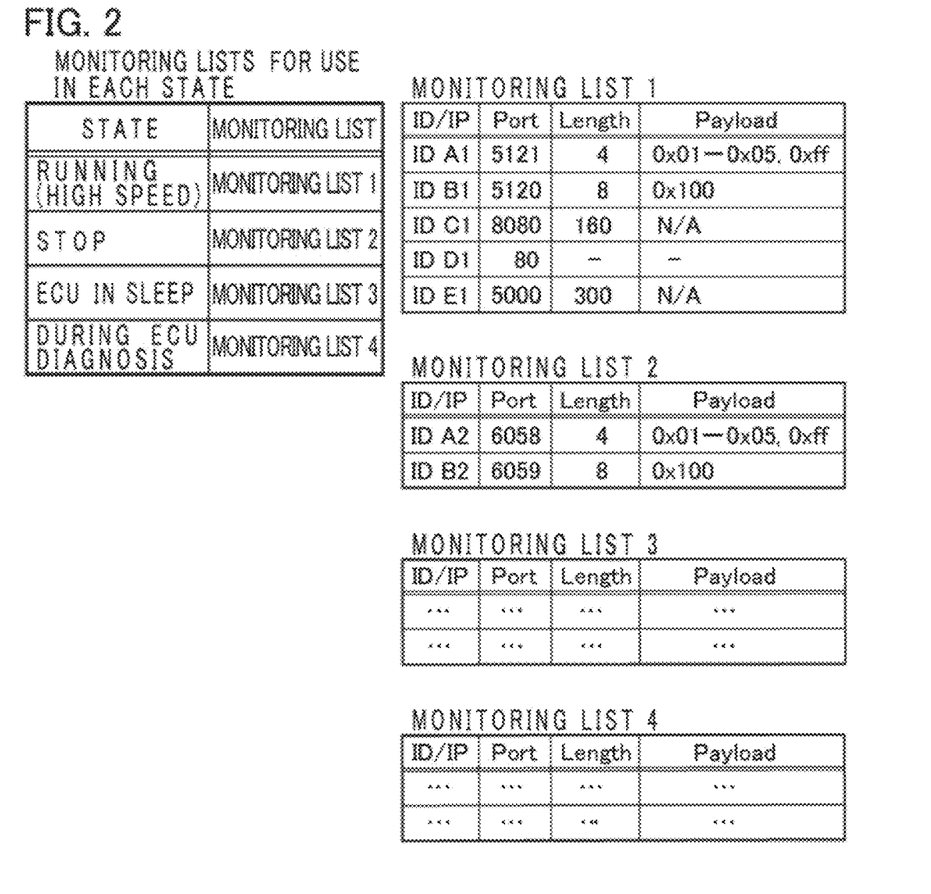
FIG. 2 is a diagram showing monitoring lists in the intrusion detection system according to Embodiment 1.

FIG. 2 shows a configuration of the monitor listing 102 in FIG. 1 which becomes a rule(s) for determining whether or not communications data is normal or abnormal, and/or a communications data group is normal or abnormal; the figure shows, by way of one example, in particular the relationships between monitoring lists and respective states.

As for the monitoring lists for use in each state, a monitoring list 1 is used in a case of a state "running (high speed)"; a monitoring list 2, used in that of a state "halt or stop"; a monitoring list 3, used in that of a state "ECU in sleep"; and a monitoring list 4, used in that of a state "during ECU diagnosis," for example.

As for each of the monitoring lists, and for a monitoring item(s) specifically in a case of Ethernet (registered trademark) communications, respective pieces of normal data such as an IP address, a port number, a payload, a count number of reception, a communications band, a communications sequence and the like are appropriately selected as a rule(s) and are each defined.

In FIG. 1, the state management unit 101 determines a state on the basis of communications data and/or on that of data in a host ECU. In addition, as for the state being acquired, a monitor listing for use in the intrusion detection unit 100 is changed over by taking into consideration of at least any one or more of the states as follows. The determination may be performed on a state by combining a plurality of states as the single state.

(A) Examples in States of a Host Motor Vehicle:
  Running (high speed, middle speed, or low speed), or stop;
  A driver, a system, or the driver and the system are operating a motor vehicle;
  During diagnosis on any one of ECUs provided with a motor vehicle, or during software update preparation thereon/during software execution thereon;
  Whether or not the communications are underway with respect to an ECU outside of a motor vehicle, another motor vehicle and/or a server (V2X or the like);
  A running location of a motor vehicle (a hill-climbing vehicle lane, a vehicle running lane, a passing vehicle lane, a tunnel, a flatland vehicle lane, hills with slopes and/or the like); and
  The weather (sunny, rainy, cloudy, snowy or the like).

(B) Examples in States of a Host ECU:
  During usual controls, during host ECU diagnosis, during parameter calibration, during sleep, during IG turn-on, and during ACC turn-on.

By taking such states into consideration, the monitoring list 1 is utilized in a case of a running state based on the table of these management lists in FIG. 2, and the monitoring list 2 is utilized in a case of a stop state based thereon, for example. As for the monitoring lists 3 and 4 also, the conditions each can be appropriately set.

The intrusion detection unit 100 acquires communications data flowing through a network, and performs, by comparing the communications data with a monitoring list corresponding to a state, determination on the presence or absence of abnormality in the communications data.

A monitoring list corresponding to a state is constituted of pieces of information related to data of the communications and/or to the timing thereof capable of flowing through only in the state.

The verification is performed whether or not any one of rules written in a monitoring list having been selected is coincident with one another.

For example, in a case of a state in which a monitoring list 2 is applied to, determination is performed so that there does not exist "abnormality" when an IP address of communications data is at A2, a port number thereof is at 6058, a payload length thereof is at 4, and also a payload thereof is from 0x01 to 0x05 or at 0xff, and when an IP address (ID/IP) thereof is at B2, a port number thereof is at 6059, a payload length thereof is at 8, and also a payload thereof is at 0x100; whereas the determination is performed so that there exists "abnormality" when any one of the rules is not coincident with one another.

The processing time management unit 103 gives rise to increasing a processing time(s) of the intrusion detection unit 100 in accordance with processing content of the intrusion detection unit 100. As for a scheme to increase a processing time(s), dummy processing (nop instructions or the like) is executed, or the processing similar to already-existing processing other than that in the intrusion detection unit 100 is executed, or abnormality determination processing on a rule defined at the time of "IG ON" other than on a rule(s) in a monitoring list(s) is executed.

To be specific, before starting the processing in the intrusion detection unit 100 or during the processing therein, a time(s) to be increased is determined on the basis of data having been received by the intrusion detection unit and/or on that of a state at that time. During the intrusion detection processing or after ending it, the calculation processes are added. In addition, a value (width) to increase a processing time(s) may be statically determined in accordance with the number of monitoring lists.

The quantity to increase may be changed so that a time to be increased is made shorter when the number of determination targets in monitoring lists is large, or that the time to be increased is made longer when the number of those determination targets is small, or the like.

Figure 3:
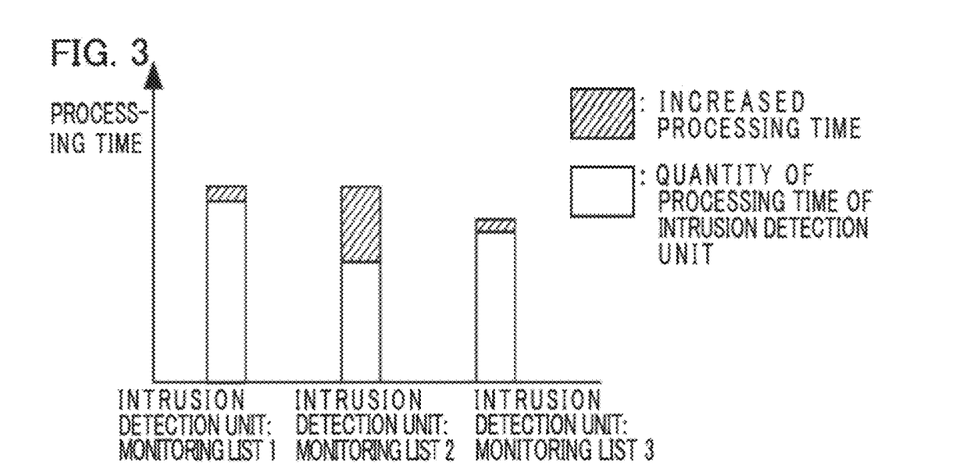
FIG. 3 is a diagram showing a modification example of processing times in the intrusion detection system according to Embodiment 1.

FIG. 3 shows an example in which processing times determined in advance with respect to a monitoring list 1, a monitoring list 2 and a monitoring list 3 are given rise to increasing the respective quantities of processing times of the intrusion detection unit 100.

Next, the explanation will be made referring to a flowchart of FIG. 4 for intrusion detection processing according to the control device 10.

The intrusion detection unit 100 receives communications data through from a communications line(s) (network) (Step S401).

The state management unit 101 determines a state on the basis of the communications data where the intrusion detection unit 100 has received and/or on that of data in a host ECU (Step S402).

For example, when information is obtained from communications data and/or from data in which a host ECU includes so that the information indicates a vehicle speed "0 km/h," and/or indicates that a position of the shift lever is at the "P (Parking)," determination of a "stop" is performed. Other than these, it may as well be suitable for using information or the like obtained from the GPS or the like.

The state management unit 101 selects a monitor listing for use in the intrusion detection unit 100 on the basis of a state in which determination is performed at all of the steps. For example, when a "stop" is determined, a monitoring list 2 is selected (Step S403).

The intrusion detection unit 100 performs determination of "normality" when communications data through from the communications line(s) exists in a monitor listing, whereas, the intrusion detection unit performs determination of "abnormality" when the communications data therethrough does not exist in the monitor listing (Step S404).

The processing time management unit 103 executes abnormality determination processing other than that on a rule(s) in a monitoring list(s) having been defined at the time of activation or a start-up so that a processing time(s) of the monitoring list(s) for use in the intrusion detection unit 100 is adjusted to change toward a value(s) determined in advance (Step S405).

In Embodiment 1, a processing time(s) of the intrusion detection unit 100 is given rise to increasing; and thus, it becomes possible to make a third party difficult to acquire information assisting a hint of attack.

Embodiment 2

Figure 5:
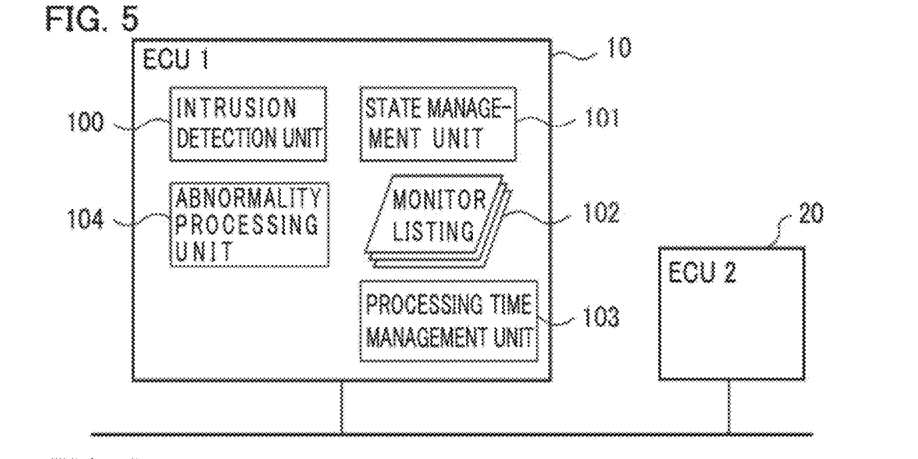
FIG. 5 is a block diagram illustrating an intrusion detection system according to Embodiment 2.

FIG. 5 is a block diagram illustrating an unauthorized entry or intrusion detection system according to Embodiment 2; and, in the diagram, the control devices 10 and 20 being onboard control devices each provided with a motor vehicle are connected to each other by way of a communications channel(s) or line(s) (network). The control device 10 is constituted of the intrusion detection unit 100, the state management unit 101, the monitor listing 102, the processing time management unit 103 and an abnormality processing unit 104, which are provided with the control device.

In Embodiment 2, differing from Embodiment 1 illustrated in FIG. 1, the embodiment has different features regarding the following points.

In Embodiment 2, the abnormality processing unit 104 is provided as illustrated in FIG. 5. The abnormality processing unit 104 performs execution on a countermeasure (at least any one or more of processes among cancelation of data, communications interruption, external notification, functional degeneration, recovery, a changeover to a redundant system, and recording), when abnormality related to communications data is caused.

To be specific, for example:
 (1) The data for cause is cancelled so that a host ECU does not utilize it, and that another ECU does not utilize it other than the host ECU.
 (2) The communications are interrupted so that data is not received through from the communications line(s) since after abnormality detection.
 (3) Abnormality content having been detected is notified to another ECU and/or to a vehicle's exterior apparatus or device(s) through a communications line(s) and/or through a wireless or radio network.

(4) After abnormality has been detected, an ECU undergoes the operations on the functions which can be operated at a minimum. For example, when a camera undergoes malfunction, a lane maintaining device's function is halted and a power steering function is only made effective to operate, so that it is made possible for a driver to move up to a safe place by using the human power.

(5) After abnormality has been detected, it is not while performed to utilize the data received since after then for the control of a host ECU, nor to utilize performing data transfer or the like toward another ECU, and so, abnormality determination processing on the data received through from a communications line(s) is kept in continuity, so that the communications are recovered in a state capable of performing the communications before the communications interruption, when a situation is achieved in which the abnormality is no more recognized (abnormal data is not detected in a predetermined period, or a motor vehicle moves in the environments in which it is no more attacked, or the like).

(6) After abnormality has been detected, the other communications party of a communications line on which the abnormality is caused, that of an IP address thereon, that of a port thereon and/or that of the like are changed over from that to another communications party, and the communications are restarted through by the another communications path.

(7) After abnormality has been detected, the time when abnormal communications data is caused and/or that when the abnormality is caused are recorded.

In addition, the processing time management unit 103 gives rise to increasing a processing time(s) in accordance with processing content of the intrusion detection unit 100 and that of the abnormality processing unit 104.

To be specific, increased is a processing time(s) of the intrusion detection unit 100 in a case in which abnormality is not caused. In addition, a processing time(s) of the intrusion detection unit 100 may be increased in another case after abnormality has been caused, and in the case after the abnormality processing unit 104 has processed a process. Before starting the processing in the intrusion detection unit 100 or during the processing therein, a time(s) to be increased is determined on the basis of data having been received by the intrusion detection unit and/or a state at that time. During the intrusion detection processing or after ending it, the calculation processes are added.

The quantity to increase may be changed so that a time to be increased is made shorter when the number of determination targets in monitoring lists is large, or that the time to be increased is made longer when the number of those determination targets is small, or the like.

Figure 6:
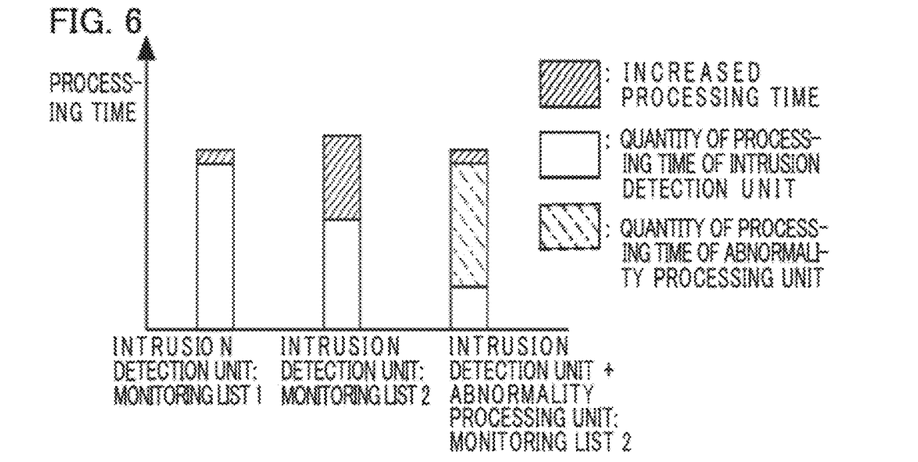
FIG. 6 is a diagram showing a modification example of processing times in the intrusion detection system according to Embodiment 2.

FIG. 6 shows an example in which processing times each determined in advance with respect to a monitoring list 1 and a monitoring list 2 are given rise to increasing the quantities of processing times of the intrusion detection unit 100 and the quantity of processing time of the abnormality processing unit 104.

In Embodiment 2, a processing time combining the intrusion detection unit 100 and the abnormality processing unit 104 with each other is given rise to increasing; and thus, it becomes possible to make a third party difficult to acquire information assisting a hint of attack (whether normal data or abnormal data).

Embodiment 3

Figure 7:
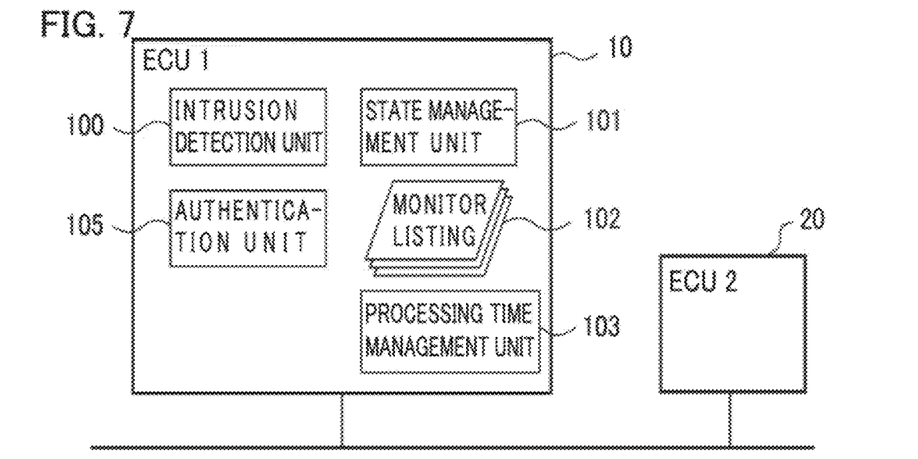
FIG. 7 is a block diagram illustrating an intrusion detection system according to Embodiment 3.

FIG. 7 is a block diagram illustrating an unauthorized entry or intrusion detection system according to Embodiment 3; and, in the diagram, the control devices 10 and 20 being onboard control devices each provided with a motor vehicle are connected to each other by way of a communications channel(s) or line(s) (network). The control device 10 is constituted of the intrusion detection unit 100, the state management unit 101, the monitor listing 102, the processing time management unit 103 and an identification or authentication unit 105, which are provided with the control device.

In Embodiment 3, differing from Embodiment 1 illustrated in FIG. 1, the embodiment has different features regarding the following points.

In Embodiment 3, the authentication unit 105 is provided as illustrated in FIG. 7. The authentication unit 105 authenticates data received from a communications line differing from a communications line in which data being processed is exchanged through by the intrusion detection unit 100, and/or the authentication unit authenticates data which is received through by the same communications line, but is not processed through by the intrusion detection unit 100. As for these sorts of authentication, it can be said on a CAN protocol that, upon through the identical communications line, an item "CAN ID 0x100" is processed by the intrusion detection unit 100, whereas an item "CAN ID 0x050" is processed by the authentication unit 105, which are indicated, for example. Owing to the degree of importance on data, resource constraints of an ECU and/or the like, there may be a case in which all of the pieces of communications data cannot be processed by the authentication unit 105.

Note that, as for authentication, the authentication is performed by using a cryptographic technology such as secret or common key cryptography, public key cryptography, an authenticator or a message authentication code, a digital signature, and/or the like.

In addition, the processing time management unit 103 gives rise to increasing processing times of the intrusion detection unit 100 in accordance with processing content of the intrusion detection unit 100 and that of the authentication unit 105.

To be specific, the processing time management unit achieves so that a processing time of the authentication unit 105 and a processing time of the intrusion detection unit 100 are made identical with each other, and/or that the difference between these processing times is made within a range determined in advance.

Figure 8:
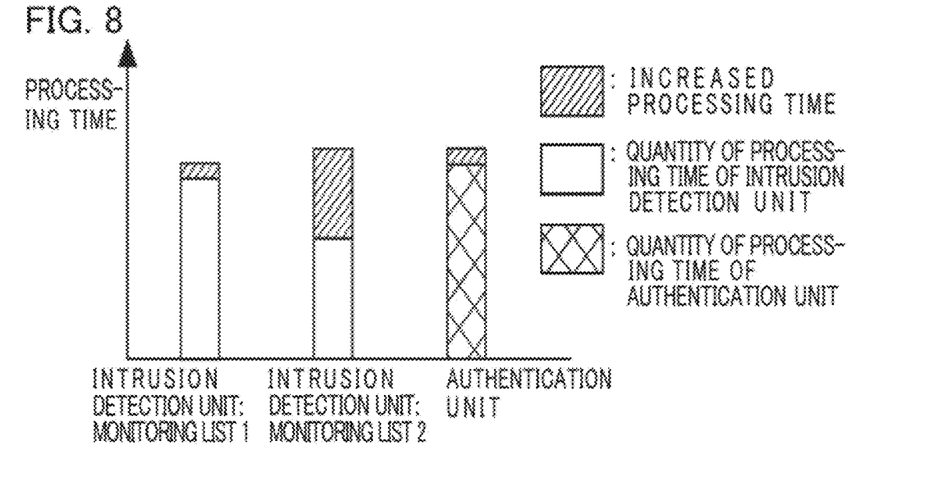
FIG. 8 is a diagram showing a modification example of processing times in the intrusion detection system according to Embodiment 3.

FIG. 8 shows an example in which processing times each determined in advance with respect to a monitoring list 1 and a monitoring list are given rise to increasing the quantities of processing times of the intrusion detection unit 100, and in addition, in which a processing time is given rise to increasing also the quantity of a processing time of the authentication unit 105.

In Embodiment 3, a processing time of the authentication unit 105 and/or those times of the intrusion detection unit 100 are given rise to increasing; and thus, it becomes possible to make a third party difficult to acquire information assisting a hint of attack (whether communications data being a subject-matter or target is attached with authentication or not, with a key of cryptograph or not).

Embodiment 4

Figure 9:
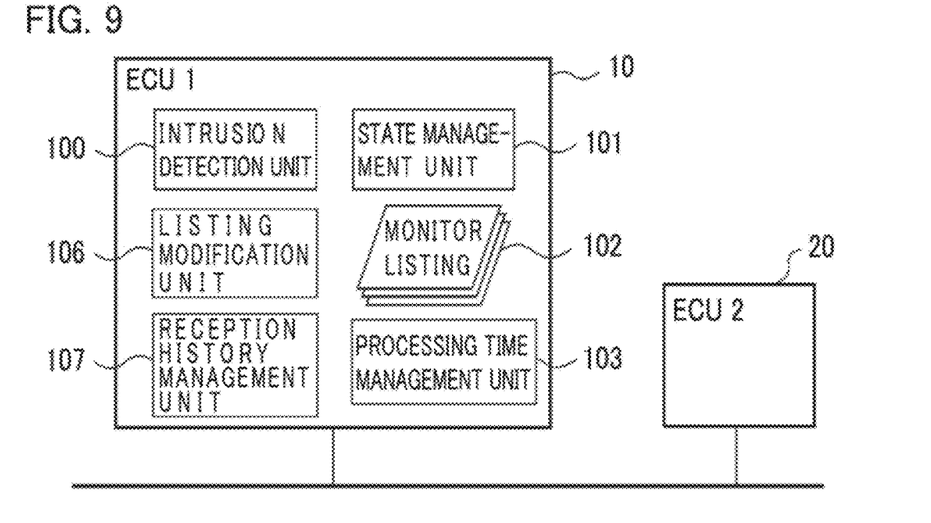
FIG. 9 is a block diagram illustrating an intrusion detection system according to Embodiment 4.

FIG. 9 is a block diagram illustrating an unauthorized entry or intrusion detection system according to Embodiment 4; and, in the diagram, the control devices 10 and 20 being onboard control devices each provided with a motor vehicle are connected to each other by way of a communications channel(s) or line(s) (network). The control device 10 is constituted of the intrusion detection unit 100, the state management unit 101, the monitor listing 102, the processing time management unit 103, a listing modification unit 106 and a reception history management unit 107, which are provided with the control device.

In Embodiment 4, differing from Embodiment 1 illustrated in FIG. 1, the embodiment has different features regarding the following points.

In Embodiment 4, the listing modification unit 106 and the reception history management unit 107 are provided as illustrated in FIG. 9.

The listing modification unit 106 changes the contents of a monitor listing (so that detection accuracy of the intrusion detection unit 100 is changed (enhanced)), based on the reception history management unit 107.

When there exists normal data which is not yet added to a monitor listing, the normal data is added to the monitor listing in a case in which a processing time of the intrusion detection unit 100 is short, and/or a case in which an important process (such a process related to the safety of a driver, that related to the privacy thereof and/or that related to the convenience thereof) is not executed by an ECU.

The reception history management unit 107 holds therein normal communications data received in a period determined in advance, a state at the time of the reception, and a count number of the reception. The reception history management unit not only holds, but also defines pieces of normal data.

The reception history management unit records normal communications data and a count number of the reception, and moreover, records together with them a state of a host ECU at the reception time and/or that of a motor vehicle thereat. From stochastic information in a period determined in advance, pieces of normal data are defined, and the data being defined is set for a subject-matter or target to be added to a monitor listing. As for the conditions being defined, capable of being adopted are a case in which a count number of reception within a period determined in advance exceeds a threshold value, a case in which a count number of the reception exceeds a threshold value, a case in which the estimation is made from dynamic changes in pieces of reception data and a count number thereof, and the like.

Note that, if there exists a detailed specification document related to communications data, pieces of normal data can be defined in detail in the monitor listing at the time of software installation into an ECU; however, these sorts of countermeasures described above can be actively made use of, because there also exists a case in which there is no specification document, or a case in which, although there is a specification document, it is not possible to accommodate the definition other than header information in the communications as normal communications data.

Figure 10:
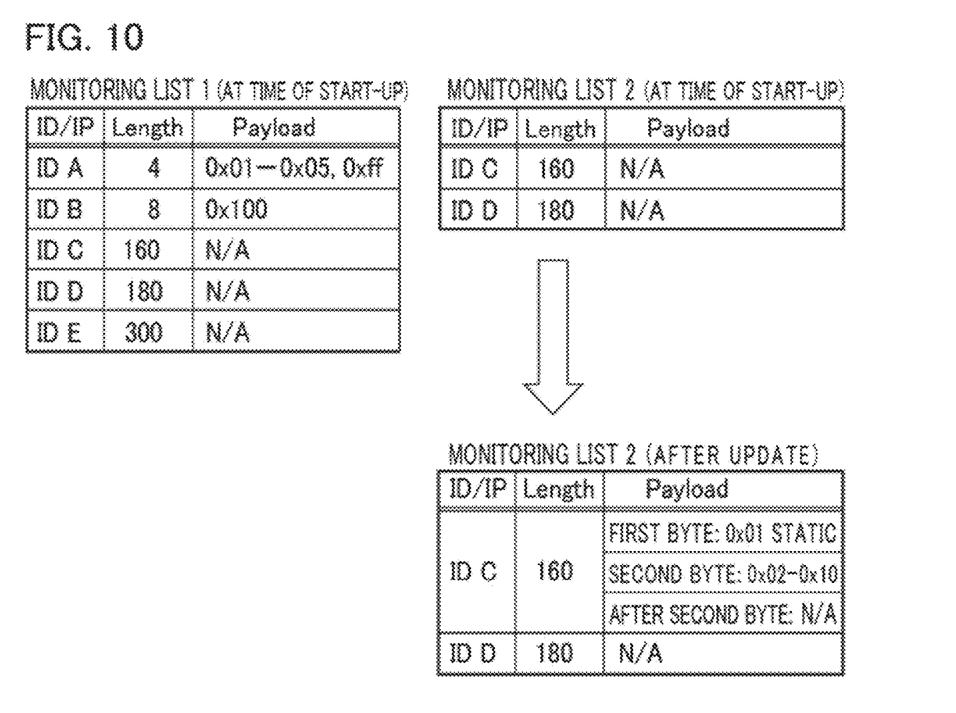
FIG. 10 is a diagram showing monitoring lists in the intrusion detection system according to Embodiment 4.

FIG. 10 shows monitoring lists; and so, the figure shows one example of the monitoring lists in Embodiment 4. In particular, the figure shows an example of a monitoring list 1 (at the time of activation or a start-up), and an example of a monitoring list 2 (at the time of activation or a start-up) and that of the monitoring list (at the time of an update). Monitoring items in these monitoring lists are appropriately selected and defined similarly to those in the management lists in Embodiment 1 shown in FIG. 2. In FIG. 10, ID/IP, Port, Length and Payload are set.

In the monitoring lists shown in FIG. 10, and in a case in which determination on a "first byte" and that on a "second byte" can be each performed so that each of them takes on a value(s) in a predetermined range, pieces of data in the monitoring list are updated. Because there is a case in which a Payload specification transmitted from an application being added is unknown, the pieces of data are changed on the basis of a reception history. As a result, a processing time increases because checking targets therefor increase in number.

Note that, by giving consideration to a case in which the "reliability or authenticity" of an item(s) being added to a listing is lower than that of an item(s) existing in the listing at the time of activation or a start-up, a process(es) in an abnormality processing unit may be changed before an addition and after the addition in between, when abnormality detection is performed by a listing after the addition. A process being executed before an addition as a process of cancelation, that of interruption therebefore and/or that of changing over a communications path therebefore are changed to a process of notification after the addition and/or to that of recording thereafter, whereby it is so arranged that a process(es) giving an influence to the motor vehicle's operations is not immediately executed.

Figure 11:
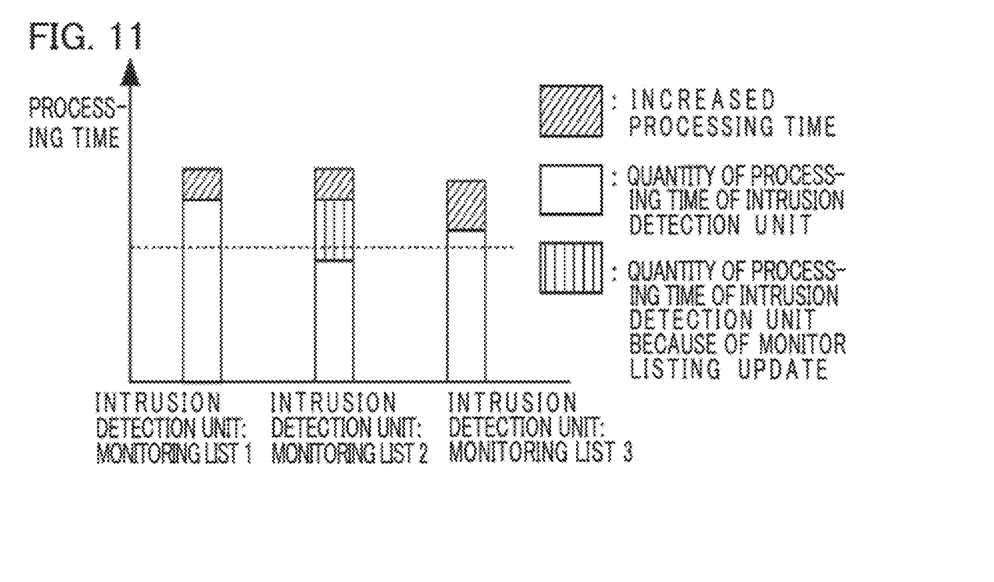
FIG. 11 is a diagram showing a modification example of processing times in the intrusion detection system according to Embodiment 4.

FIG. 11 shows an example in which processing times each determined in advance with respect to a monitoring list 1, a monitoring list 2 and a monitoring list 3 are given rise to increasing the quantities of processing times of the intrusion detection unit 100, and in addition, in which the processing time is given rise to increasing the quantity of processing time of the intrusion detection unit 100 because the monitor listing is updated (changed).

Figure 12:
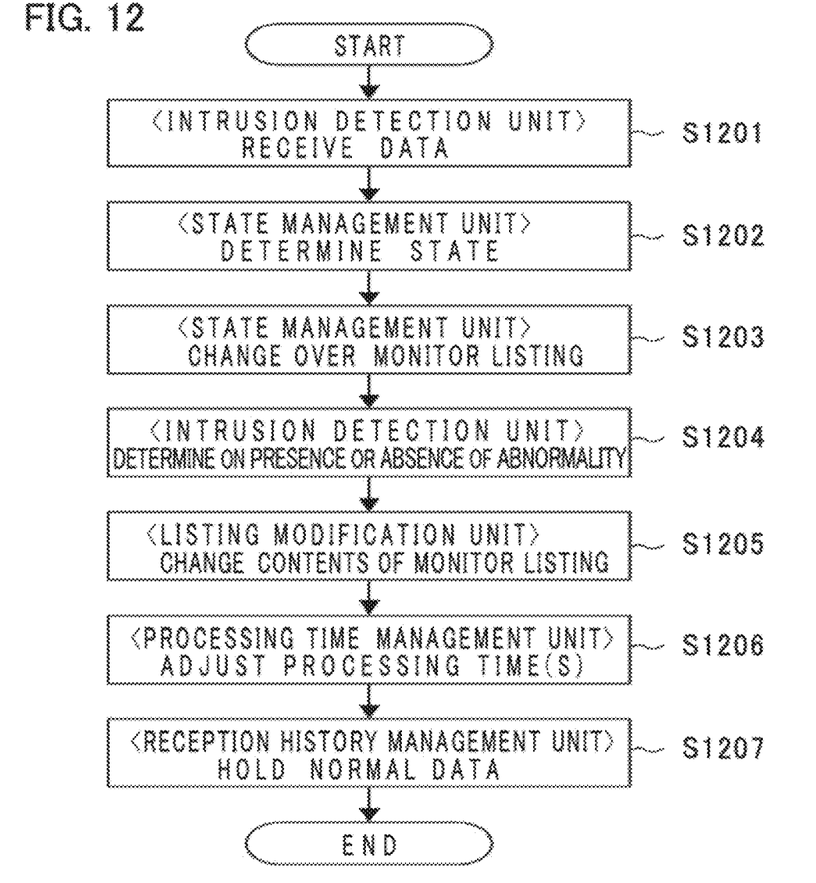
FIG. 12 is a flowchart showing intrusion detection processing of the intrusion detection system according to Embodiment 4.

Next, the explanation will be made referring to a flowchart of FIG. 12 for intrusion detection processing according to the intrusion detection system in Embodiment 4.

Figure 4:
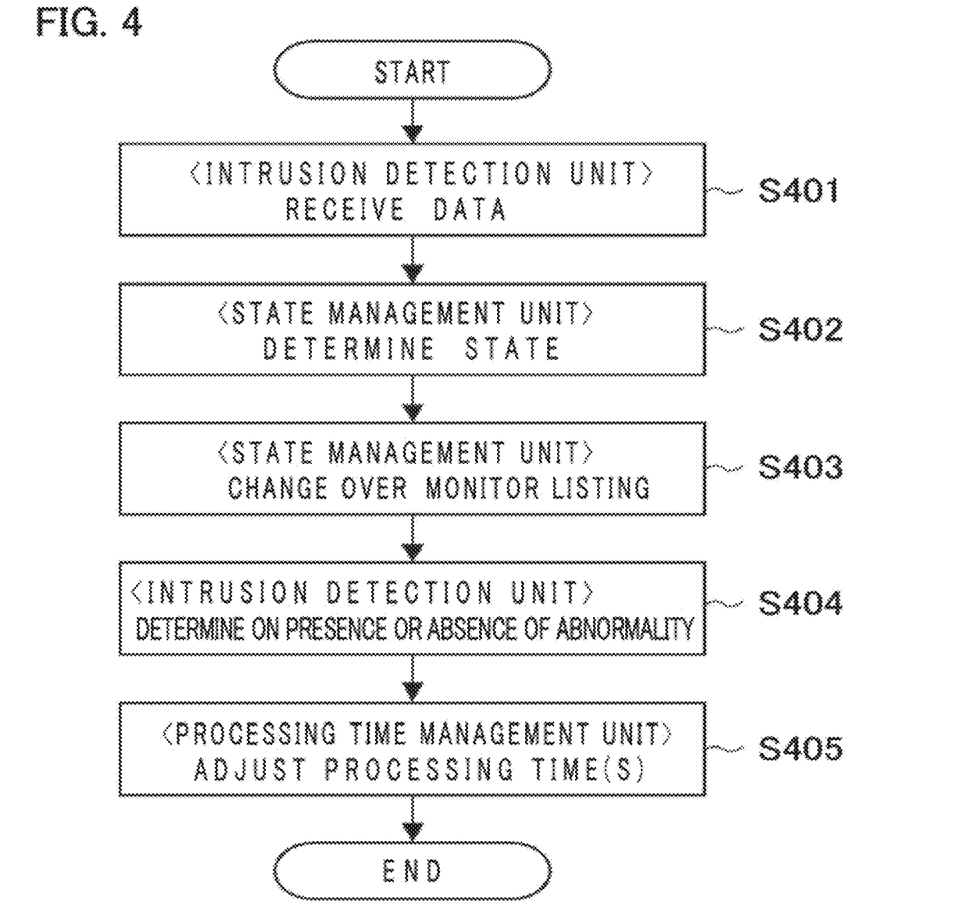
FIG. 4 is a flowchart showing intrusion detection processing of the intrusion detection system according to Embodiment 1.

Step S1201, Step S1202, Step S1203, Step S1204 and Step S1206 are the steps corresponding to Step S401, Step S402, Step S403, Step S404 and Step S405 in Embodiment 1 shown in FIG. 4, and so, a similar process is executed at each step.

The listing modification unit 106 changes the contents of a monitor listing at modification timing determined in advance (Step S1205). The modification timing is exactly described as follows.

(1) After the intrusion detection unit 100 has performed abnormality determination, a process is changed in a case in which a processing time of the intrusion detection unit 100 at the time when a monitor listing is used for is shorter than a value determined in advance (checking targets constituting the monitor listing are given rise to increasing).

(2) In a case in which an important process is not executed by an ECU, the contents of a listing are changed by using a similar means at timing differing from that for the intrusion detection processing.

The reception history management unit 107 records: a reception time (or passage of time from the time of ECU's activation or start-up) at the time when determination is performed by the intrusion detection unit 100 so that reception data is normal; the header of communications data at that time; and a payload thereof at that time (Step S1207). In addition, a state at a time when the communications data has been received is also collectively recorded. Location information at such a time and/or information of a driver thereat may be recorded. Moreover, stochastic processing is executed on the information being recorded; however, the processing thereon may not be necessarily executed within the procedure of the flowchart.

In Embodiment 4, a monitor listing is changed in which a processing time of the intrusion detection unit 100 becomes at a value determined in advance or less, and the processing time of the intrusion detection unit 100 is given rise to increasing; and thus, it becomes possible to make a third party difficult to acquire information assisting a hint of attack (which one of states has the number of pieces of communications data larger in allowed pieces thereof or not). In addition, it is possible to increase a subject-matter(s) or target(s) to which abnormality detection can be performed.

Embodiment 5

Figure 13:
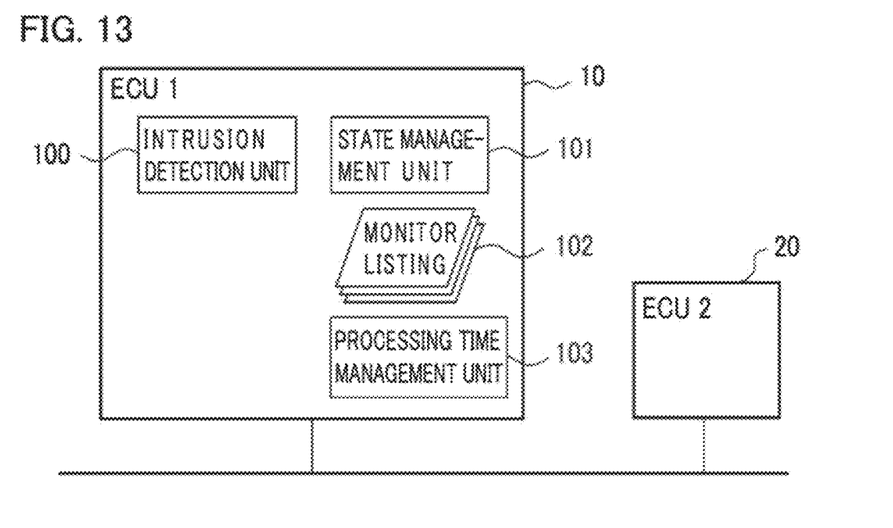
FIG. 13 is a block diagram illustrating an intrusion detection system according to Embodiment 5.

FIG. 13 is a block diagram illustrating an unauthorized entry or intrusion detection system according to Embodiment 5; and, in the diagram, the control devices 10 and 20 being onboard control devices each provided with a motor vehicle are connected to each other by way of a communications channel(s) or line(s) (network). The control device 10 is constituted of the intrusion detection unit 100, the state management unit 101, the monitor listing 102 and the processing time management unit 103, which are provided with the control device.

Embodiment 5 differs from Embodiment 1 illustrated in FIG. 1 on a point having a feature in which a lacking or shortage quantity of a processing time is given rise to increasing the quantity so that processing times each in the processing time management unit 103 take on a constant value determined in advance.

Figure 14:
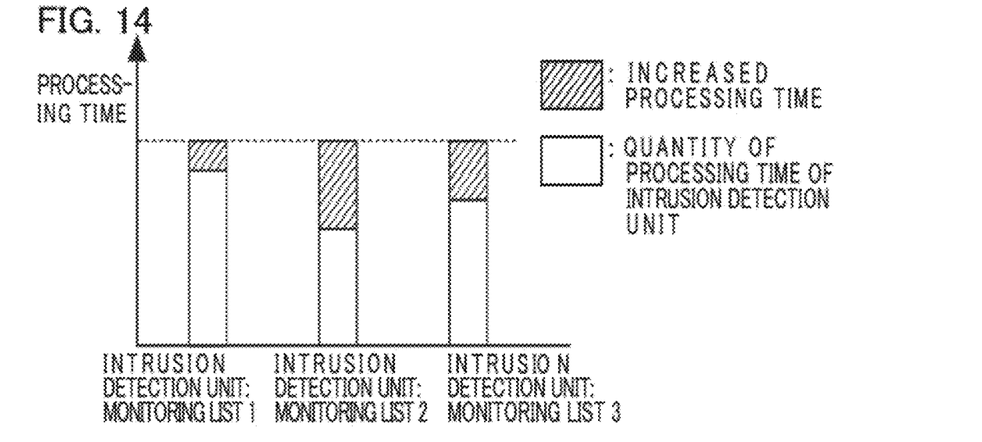
FIG. 14 is a diagram showing a modification example of processing times in the intrusion detection system according to Embodiment 5.

FIG. 14 shows an example in which processing times each determined in advance with respect to a monitoring list 1, a monitoring list 2 and a monitoring list 3 are given rise to increasing the quantities of processing times of the intrusion detection unit 100, so that each of their processing times takes on the same.

In Embodiment 5, those processing times are each increased by the processing time management unit 103 so as to take on a constant value determined in advance, whereby it becomes possible to make a third party difficult to acquire information assisting a hint of attack (whether communications data being a subject-matter or target is attached with authentication or not, with key of cryptograph or not).

Embodiment 6

Figure 15:
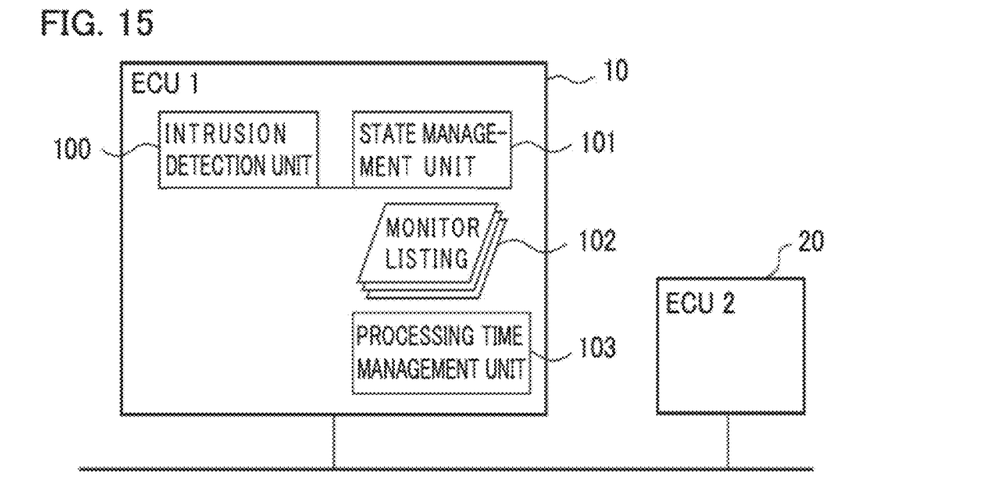
FIG. 15 is a block diagram illustrating an intrusion detection system according to Embodiment 6.

FIG. 15 is a block diagram illustrating an unauthorized entry or intrusion detection system according to Embodiment 6; and, in the diagram, the control devices 10 and 20 being onboard control devices each provided with a motor vehicle are connected to each other by way of a communications channel(s) or line(s) (network). The control device 10 is constituted of the intrusion detection unit 100, the state management unit 101, the monitor listing 102 and the processing time management unit 103, which are provided with the control device. A basic configuration of the control device 10 is the same as that of Embodiment 1; however, a feature resides in that, in Embodiment 6, the processing time management unit 103 sets times to be increased on a random basis.

Figure 16:
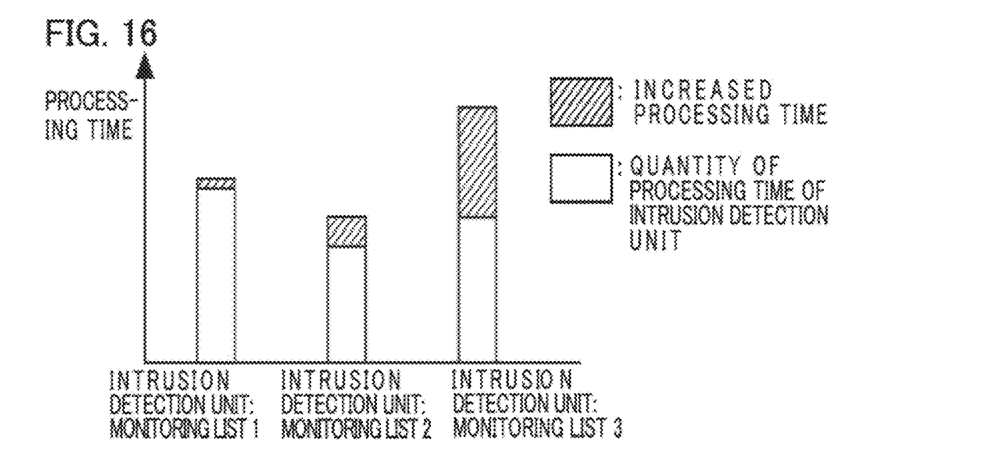
FIG. 16 is a diagram showing a modification example of processing times in the intrusion detection system according to Embodiment 6.

FIG. 16 shows an example in which processing times each to be increased on the quantities of processing times of the intrusion detection unit 100 are set on a random basis with respect to every one of a monitoring list 1, a monitoring list 2 and a monitoring list 3.

In Embodiment 6, the times to be increased by the processing time management unit are set on a random basis, whereby it becomes possible to make a third party difficult even more to acquire information assisting a hint of attack (whether communications data being a subject-matter or target is attached with authentication or not, with a key of cryptograph or not).

Note that, the rules are not necessarily limited to those as set forth in the monitor listing for use in each of the embodiments as described above. And so, when a rule(s) can be derived from the information being defined in relation to a communications line(s) and/or communications data, it may appropriately be justifiable as a rule(s) when the rule(s) is formed by using, in a case of Ethernet, for example, part or all of header information of Ethernet, an IP thereof, and/or a TCP/UDP thereof, an SOME/IP thereof, a ServiceDiscovery thereof, an HTTP thereof and the like, or when the rule(s) is formed by using, in the case of Ethernet, a payload portion of an IP packet, and in addition, by using the timing of data reception, a communications band, a communications sequence, the data correlation between packets and/or the like. If normal data can be similarly specified also in other communications protocols (CAN, FlexRay, LIM, MOST and the like), it is not necessarily limited to those.

Only one monitor listing is assigned in accordance with a state; however, the state may be defined by combining a plurality of listings with one another.

Figure 17:
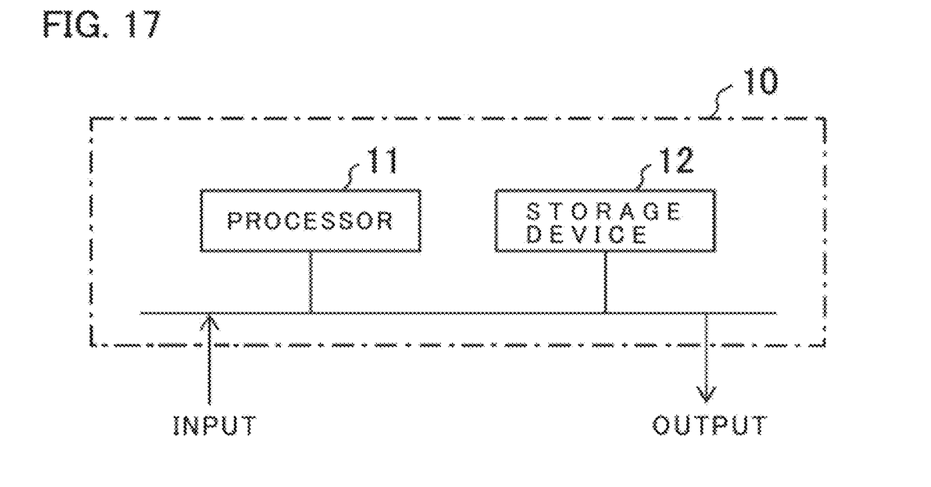
FIG. 17 is a diagram showing, by way of one example, a hardware configuration of a control apparatus or device (10; 20)) in an intrusion detection system according to the embodiments each.

It should be noted that, as an example of hardware is shown in FIG. 17, the control device 10 is constituted of a processor 11 and a memory or storage device 12. The storage device 12 is provided with a volatile storage device of a random access memory (RAM) or the like, and with a nonvolatile auxiliary storage device of a flash memory or the like, for example. In addition, in place of the flash memory, an auxiliary storage device of a hard disk may be provided with. The processor 11 executes a program(s) inputted from the storage device 12. In this case, the program(s) is inputted into the processor 11 from the auxiliary storage device by way of the volatile storage device. Moreover, the processor 11 may output its data of a calculated result(s) or the like into the volatile storage device of the storage device 12, or may store the data into the auxiliary storage device by way of the volatile storage device.

In the present disclosure of the application concerned, various exemplary embodiments and exemplary embodiments are described; however, various features, aspects and functions described in a single or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND SYMBOLS

Numerals "10" and "20" each designate a control device; "100," intrusion detection unit; "101," state management unit; "102," monitor listing; "103," processing time management unit; "104," abnormality processing unit; "105," authentication unit; "106," listing modification unit; and "107," reception history management unit.

The invention claimed is:

1. An intrusion detection system which performs detection on unauthorized data which enters into a control device of a motor vehicle where the control device is connected by way of a communications line, the intrusion detection system, comprising:
a monitor listing for setting a rule on which determination is performed whether communications data is normal or abnormal in every one of respective states;
intrusion detection circuitry for acquiring communications data flowing through the communications line, and for performing, by comparing said communications data with said monitor listing, determination on a presence or absence of abnormality in said communications data;
state management circuitry for acquiring a state of a host motor vehicle and/or that of the control device, and for changing over said monitor listing for use in the intrusion detection circuitry;
processing time management circuitry for giving rise to increasing a processing time of the intrusion detection circuitry in accordance with processing content of the intrusion detection circuitry.

2. The intrusion detection system as set forth in claim 1, further comprising:
abnormality processing circuitry for executing, when abnormality related to said communications data is caused, a process with respect to the abnormality, wherein
the processing time management circuitry gives rise to increasing a processing time of the intrusion detection circuitry in accordance with processing content of the intrusion detection circuitry and that of the abnormality processing circuitry.

3. The intrusion detection system as set forth in claim 1, further comprising:
authentication circuitry for authenticating communications data flowing through the communications line by using a key of cryptograph, and for performing determination on a presence or absence of abnormality in communications data which differs from that in the intrusion detection circuitry, wherein
the processing time management circuitry gives rise to increasing a processing time of the intrusion detection circuitry in accordance with processing content of the intrusion detection circuitry and/or that of the authentication circuitry.

4. The intrusion detection system as set forth in claim 1, further comprising:
reception history management circuitry for holding normal communications data received in a period determined in advance, a state of a motor vehicle at a time of the reception therein and/or that of a host control device thereat, and a count number of the reception therein; and
listing modification circuitry for changing a rule of said monitor listing based on the reception history management circuitry.

5. The intrusion detection system as set forth in claim 2, further comprising:
reception history management circuitry for holding normal communications data received in a period determined in advance, a state of a motor vehicle at a time of the reception therein and/or that of a host control device thereat, and a count number of the reception therein; and
listing modification circuitry for changing a rule of said monitor listing based on the reception history management circuitry.

6. The intrusion detection system as set forth in claim 3, further comprising:
reception history management circuitry for holding normal communications data received in a period determined in advance, a state of a motor vehicle at a time of the reception therein and/or that of a host control device thereat, and a count number of the reception therein; and
listing modification circuitry for changing a rule of said monitor listing based on the reception history management circuitry.

7. The intrusion detection system as set forth in claim 1, wherein the processing time management circuitry gives rise to increasing a processing time so as to take on a constant value.

8. The intrusion detection system as set forth in claim 2, wherein the processing time management circuitry gives rise to increasing a processing time so as to take on a constant value.

9. The intrusion detection system as set forth in claim 3, wherein the processing time management circuitry gives rise to increasing a processing time so as to take on a constant value.

10. The intrusion detection system as set forth in claim 4, wherein the processing time management circuitry gives rise to increasing a processing time so as to take on a constant value.

11. The intrusion detection system as set forth in claim 5, wherein the processing time management circuitry gives rise to increasing a processing time so as to take on a constant value.

12. The intrusion detection system as set forth in claim 6, wherein the processing time management circuitry gives rise to increasing a processing time so as to take on a constant value.

13. The intrusion detection system as set forth in claim 1, wherein the processing time management circuitry sets a processing time so as to give rise to increasing processing times on a random basis.

14. The intrusion detection system as set forth in claim 2, wherein the processing time management circuitry sets a processing time so as to give rise to increasing processing times on a random basis.

15. The intrusion detection system as set forth in claim 3, wherein the processing time management circuitry sets a processing time so as to give rise to increasing processing times on a random basis.

16. The intrusion detection system as set forth in claim 4, wherein the processing time management circuitry sets a processing time so as to give rise to increasing processing times on a random basis.

17. The intrusion detection system as set forth in claim 5, wherein the processing time management circuitry sets a processing time so as to give rise to increasing processing times on a random basis.

18. The intrusion detection system as set forth in claim 6, wherein the processing time management circuitry sets a processing time so as to give rise to increasing processing times on a random basis.

* * * * *